United States Patent Office 2,967,877
Patented Jan. 10, 1961

2,967,877

COMPOUNDS CONTAINING BORON AND SILICON

Stephen J. Groszos, Cincinnati, Ohio, assignor to American Cyanamid Company, New York, N.Y., a corporation of Maine No Drawing. Original application Sept. 24, 1957, Ser. No. 685,826, now Patent No. 2,915,543, dated Dec. 1, 1959. Divided and this application Nov. 19, 1958, Ser. No. 774,832

5 Claims. (Cl. 260—448.2)

This application is a division of my copending application Serial No. 685,826, filed September 24, 1957, now U.S. Patent No. 2,915,543, issued December 1, 1959.

This invention relates to new chemical compounds and more particularly to compounds containing boron and silicon. Still more particularly, the invention is concerned with new and useful compounds containing boron, oxygen, and silicon.

No anticipatory prior art is known. Patnode U.S. Patent No. 2,434,953, dated January 27, 1948, discloses a borate of lower-alkylpolysiloxane, and more particularly the Si-containing material or complex obtained by effecting reaction between boric acid and lower-alkyl-halogenopolysiloxane substance containing an average of from 0.16 to 1.0 halogen atom per silicon atom. Krieble U.S. Patent No. 2,440,101, dated April 20, 1948, discloses and claims tris-(trimethylsilyl) borate, the formula for which is (I) 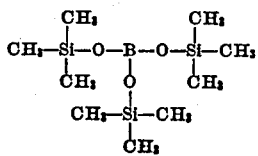

The compounds of this invention may be represented graphically by the following general formula:

(II) 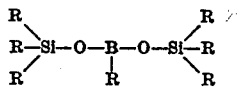

wherein each R represents a radical of the class consisting of aryl, alkaryl, and halogenoaryl radicals, and are the same or different. An allustrative example of a compound embraced by Formula II is di-(triphenylsilyl)-phenylboronate, which also properly may be designated as triphenylsilylphenylboronate, and the formula for which is (III) 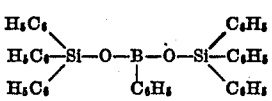

The compounds of the present invention should not be confused with the polymeric reaction products of a hydrocarbosilanediol and a hydrocarbon-boronic acid, which polymeric reaction products are described in Upson Patent No. 2,517,945, dated August 8, 1950, as "having as recurring structural units

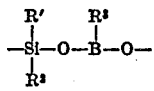

where R', R², and R³ are monovalent hydrocarbon radicals." Upson obtains his polymers by heating "a mixture of a polyhydric organosilanol, for example, diphenylsilanediol, and a boronic acid, for example, benzene-boronic acid, under atmospheric pressure in a reaction vessel at a temperature sufficient to melt the reactants and to vaporize the water which is formed, preferably at 170° to 260° C. When the evolution of water subsides, the resulting viscous molten polymer is heated under reduced pressure to remove any water vapor or other volatile products remaining in the mixture. The polymer is then allowed to cool to room temperature." Upson also states that "Modifying agents such as monohydric organo-silanols (R₃SiOH) and boronic [borinic] acids (R₂BOH) may be added to the reactants either at the start or at any stage of the reaction. These agents act to terminate polymer chains and are accordingly useful in controlling the molecular weight of the polymers."

Illustrative examples of aryl radicals represented by R in Formula II are phenyl, bihpenylyl or xenyl, naphthyl, etc.; of alkaryl radicals, tolyl, xylyl, ethylphenyl, propylphenyl, isopropylphenyl, butylphenyl, etc.; while illustrative examples of halogenoaryl radicals represented by R in Formula II are the halogenated (chlorinated, brominated, fluorinated and iodinated) aryl radicals, including the perhalogenated radicals, corresponding to the aryl radicals mentioned above by way of example. Still other examples of radicals represented by R in Formula II will be apparent to those skilled in the art from the foregoing illustrative examples.

The B, Si compounds (i.e., compounds containing boron and silicon) of this invention have improved hydrolytic resistance and thermal resistance (often referred to as "hydrolytic stability" and "thermal stability") as compared with most of the prior organoboron compounds. They are useful, for instance, as chemical intermediates in the preparation of organic materials containing both boron and silicon in the molecule. They can be employed in high-temperature applications, as modifiers of conventional polymeric materials, including synthetic resins, and as neutron absorbers. They also are useful as components of flame-resisting compositions; as plasticizers; as scintillation counters; as the active ingredient in insecticides, bactericides, germicides, fungicides, pesticides, and the like; as a component of arc-extinguishing tubes, and especially of surfaces that are exposed to the action of the arc. Other uses include: as polymer additives to impart neutron-absorbing properties to the polymer to which the compound of the invention is added and to improve the thermal stability of the polymer; as heat-exchange media or as modifiers of such media whereby they can be used at higher temperatures; as petroleum additives which are hydrolytically stable (e.g., as viscosity-index improvers, in lubricants and greases for high-temperature applications, as cetane improvers, ignition promoters, anti-knock agents, preventives of pre-ignition, etc.); and in making new types of dyes and pigments.

In any of the aforementioned and other applications or uses, one can employ a single compound of the kind embraced by Formula II or a plurality of such compounds in any proportions. They can be used in conjunction with any of the conventional components of flame-resisting compositions, plasticizers, insecticides, bactericides, germicides, fungicides, pesticides, and other compositions hereinbefore mentioned by way of illustrating the fields of utility, generically and specifically, of the boronates of this invention.

The symmetrical compounds of this invention can be prepared, for example, by reacting together (1) a boronic acid represented by the general formula (IV) 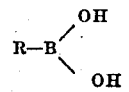

where R has the same meaning as given above with reference to Formula II and (2) a silicon compound represented by the general formula (V) 

wherein each R has the same meaning as given above with reference to Formula II, and Y represents a radical of the class consisting of —OH and —$NH_2$ radicals, the boronic acid of (1) and the silicon compound of (2) being employed in a molar ratio of at least 2 moles of the latter per mole of the former; and isolating a compound represented by Formula II from the resulting reaction mass.

Unsymmetrical compounds of the invention can be prepared, for example, by using a mixture of different starting reactants; that is, compounds wherein the aryl, alkaryl, or halogenoaryl substituents are different. Thus, one can react, for instance, one mole of phenylboronic acid with two moles of tri-(p-tolyl)silanol to produce di-(tri-p-tolylsilyl)phenylboronate.

In order that those skilled in the art may better understand how the present invention can be carried into effect, the following examples are given by way of illustration and not by way of limitation. All parts and percentages are by weight unless otherwise indicated.

EXAMPLE 1

(VI) 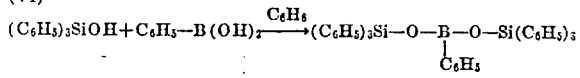 

Into a three-necked flask equipped with a stirrer and a condenser provided with a Dean and Stark trap are charged 27.23 g. (0.1 mole) triphenylsilanol [prepared by hydrolysis of $(C_6H_5)_3SiCl$], 6.09 g. (0.05 mole) phenylboronic acid and 75 ml. benzene. The reaction mixture is refluxed until 1.4 ml. water has azeotroped into the trap (theoretical water of reaction is 1.8 ml.). Benzene is then removed from the reaction mass until a filterable slurry remains. The solid fraction is filtered off and recrystallized from hexane to give white crystals, M.P. 132°–133° C. Infrared analysis confirms the product as being di-(triphenylsilyl)phenylboronate. The total yield of recrystallized product is 71% of the theoretical, which corresponds to the percent (of the total) of water of reaction obtained.

Analysis:

|  | C | H |
| --- | --- | --- |
| Calculated for $C_{42}H_{35}BSi_2O_2$ | 79.98 | 5.52 |
| Found | (a) 78.24 | 5.59 |
|  | (b) 79.45 | 5.82 | a Sample is mixed with CuO prior to combustion.
b A rapid C+H determination is used.

EXAMPLE 2

Di-(tri-m-chlorophenylsilyl)phenylboronate is obtained by following the method of Example 1 but using 0.1 mole of tri-(m-chlorophenyl)silanol instead of 0.1 mole of triphenylsilanol. The structure is confirmed by infrared analysis, and the total yield of recrystallized product is more than 65% of the theoretical.

EXAMPLE 3

A. Preparation of triphenylsilylamine (VII)  $(C_6H_5)_3SiCl + NH_3 \rightarrow (C_6H_5)_3SiNH_2 + HCl$ Triphenylsilylamine is prepared (using the method of Kraus and Rosen) by liquefying an excess of ammonia in a flask charged with 88.2 g. (0.3 mole) triphenylchlorosilane. After stirring for two hours at low temperatures, ca. —70° C., the reaction mixture is allowed to warm to room temperature. The light brown solid which remains after the excess ammonia has vaporized is then extracted for 2 hours with petroleum ether, using a Soxhlet extractor. The resulting orange solution is heated with decolorizing carbon and filtered hot. On standing, 27.89 g. triphenylsilylamine crystallizes out of the light yellow solution. Concentration of the filtrate results in an additional crop of 13.53 g. of the colorless solid, M.P. 53°–55° C. The total yield is 50% of the theoretical.

B. Preparation of di-(triphenylsilyl)phenylboronate (VIII) 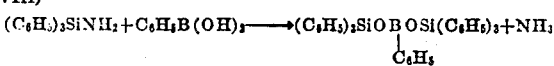 

A three-necked flask, equipped with a stirrer, nitrogen-inlet and a Dean and Stark trap with a condenser and drying tube, is charged with 27.89 g. (0.101 mole) triphenylsilylamine, 6.09 g. (0.05 mole) phenylboronic acid and 75 ml. benzene. The reaction mixture is heated to reflux and after two hours at reflux only a negligible amount of water has collected in the trap. Tests with HCl at the exit drying tube indicate the evolution of ammonia during the reaction. On cooling the concentrated benzene solution, a colorless crystalline solid is obtained. Infrared analysis of a recrystallized portion of the solid, M.P. 131.5°–133° C., confirms the identity of the product as di-(triphenylsilyl)phenylboronate.

Analysis:

|  | C | H |
| --- | --- | --- |
| Calculated for $C_{42}H_{35}BSi_2O_2$ | 79.98 | 5.52 |
| Found | 77.90 | 1 5.51 |

1 Mixed in a capsule with CuO.

It was surprising and unobvious that di-(triphenylsilyl)-phenylboronate would be the product of the foregoing reaction, since normally it would be expected that the product would be N,N'(triphenylsilyl)phenylboronamide.

EXAMPLE 4

Example 1 is repeated exactly but using 0.1 mole tri-p-tolysilanol and 0.05 mole m-chlorophenylboronic acid. The structure of the product is confirmed by infrared analysis as being di-(tri-p-tolylsilyl)m-chlorophenylboronate. The product, after recrystallization, is obtained in a yield corresponding to about 70% of the theoretical.

EXAMPLE 5

| | Parts |
| --- | --- |
| Polyvinylchloride (gamma polyvinyl chloride) | 100 |
| Di-(triphenylsilyl)phenylboronate | 50 | are mixed together on a standard rubber mill at about 135° C. until a sheet, 40 to 50 mils thick, is obtained. The resulting sheet is flexible, tough, somewhat elastic and has good tensile strength characteristics. It is suitable for uses where polyvinyl chloride compositions are now employed.

One can replace part of the di-(triphenylsilyl)phenylboronate used in the above formulation, for instance up to 90% by weight thereof (45 parts), with other plasticizers for polyvinyl chloride, e.g., a saturated aliphatic hydrocarbon triester of cyanuric acid, especially a trialkyl cyanurate and more particularly one containing not less than 4 and not more than 6 carbon atoms in each alkyl radical. The cyanuric triester not only functions as a plasticizer for polyvinyl chloride but also renders the plasticized composition resistant to discoloration under the action of heat.

The compounds of this invention can be used in plasticized polyvinyl halide (chloride, bromide, etc.) and polyvinylidene halide (chloride, bromide, etc.) Compositions, alone or with other plasticizers or modifiers, in amounts corresponding to from 2% to 65% by weight of the plasticized composition.

Uses of the boron and silicon-containing compounds

I claim:
1. A compound represented by the general formula

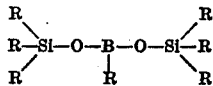

wherein each R represents a radical selected from the class consisting of aryl, alkaryl, and halogenoaryl radicals.
2. A compound as in claim 1 wherein each R represents the same radical selected from the class consisting of aryl, alkaryl, and halogenoaryl radicals.
3. Di-(triphenylsilyl)phenylboronate.
4. Di-(tri-m-chlorophenylsilyl)phenylboronate.
5. Di-(tri-p-tolylsilyl)m-chlorophenylboronate.

References Cited in the file of this patent

UNITED STATES PATENTS

| | | |
|---|---|---|
| 2,517,945 | Upson | Aug. 8, 1950 |
| 2,611,775 | Barry | Sept. 23, 1952 |
| 2,720,495 | Phreaner | Oct. 11, 1955 |
| 2,888,419 | Safford | May 26, 1959 |
| 2,915,543 | Groszos | Dec. 1, 1959 |

OTHER REFERENCES

Lissner et al.: "Chemische Technik (Berlin)," vol. 2, No. 6, June 1950, pp. 181–3.

Wiberg et al.: "Zeitschrift für Naturforschung," vol. 8b (October 1953), pp. 609–10.

Wiberg et al.: "Angewandte Chemie," vol. 66, No. 12, June 1954, pp. 339–40.